(12) United States Patent
Pulaski

(10) Patent No.: US 11,036,931 B2
(45) Date of Patent: Jun. 15, 2021

(54) GRID-BASED DATA PROCESSING WITH CHANGEABLE CELL FORMATS

(71) Applicant: GrowthPlan LLC, Houston, TX (US)

(72) Inventor: Eric Pulaski, Houston, TX (US)

(73) Assignee: GrowthPlan LLC, Houston, TX (US)

( * ) Notice: Subject to any disclaimer, the term of this patent is extended or adjusted under 35 U.S.C. 154(b) by 8 days.

(21) Appl. No.: 16/546,079

(22) Filed: Aug. 20, 2019

(65) Prior Publication Data

US 2020/0065365 A1 Feb. 27, 2020

Related U.S. Application Data

(60) Provisional application No. 62/720,549, filed on Aug. 21, 2018.

(51) Int. Cl.
*G06F 40/18* (2020.01)

(52) U.S. Cl.
CPC .................................. *G06F 40/18* (2020.01)

(58) Field of Classification Search
None
See application file for complete search history.

(56) References Cited

U.S. PATENT DOCUMENTS

| | | | |
|---|---|---|---|
| 5,603,021 A | 2/1997 | Spencer et al. | |
| 6,317,758 B1 * | 11/2001 | Madsen | G06F 40/18 715/220 |
| 8,151,056 B2 | 4/2012 | Gould | |
| 8,589,869 B2 | 11/2013 | Wolfram | |
| 9,286,285 B1 * | 3/2016 | Vagell | G06F 40/18 |
| 9,489,367 B2 | 11/2016 | Danzinger et al. | |
| 10,191,897 B1 | 1/2019 | Olkin | |
| 2002/0055954 A1 * | 5/2002 | Breuer | G06F 40/18 715/220 |
| 2002/0161799 A1 * | 10/2002 | Maguire, III | G06F 40/18 715/212 |
| 2003/0117447 A1 | 6/2003 | Mujica et al. | |
| 2006/0288267 A1 | 12/2006 | Despain | |
| 2007/0260667 A1 * | 11/2007 | Duzak | G06F 9/5066 708/521 |

(Continued)

FOREIGN PATENT DOCUMENTS

WO 01/98928 A2 12/2001

OTHER PUBLICATIONS

Engels, Gregor, et al., "ClassSheets: Automatic Generation of Spreadsheet Applications from Object-Oriented Specifications," ASE, Nov. 7-11, 2005, 10 pages.

(Continued)

*Primary Examiner* — Howard Cortes
(74) *Attorney, Agent, or Firm* — Lewis & Reese, PLLC

(57) ABSTRACT

Methods and systems for providing an improved grid-based data processing experience are described. Using the improved grid-based data processing system, a user can edit cells in a way that is intuitive, and the system automatically checks and adjusts the grid to alleviate any circular references or violations of relationships among the cells of the grid. For example, if a user's edit to a target cell creates a circular reference or breaks a predefined relationship, the system can automatically edit one or more other cells of the grid to obviate the problem. Such automatic editing may involve deriving a new formula to populate one or more non-target cells.

20 Claims, 13 Drawing Sheets

(56) References Cited

U.S. PATENT DOCUMENTS

| | | | |
|---|---|---|---|
| 2009/0044092 A1* | 2/2009 | Rapp | G06F 40/18 |
| | | | 715/219 |
| 2011/0072340 A1 | 3/2011 | Miller et al. | |
| 2011/0314365 A1* | 12/2011 | Messerly | G06F 40/18 |
| | | | 715/219 |
| 2014/0337718 A1 | 11/2014 | Bostian et al. | |
| 2015/0193422 A1* | 7/2015 | Cudak | G06F 11/362 |
| | | | 715/219 |
| 2018/0203838 A1* | 7/2018 | Hiatt | G06F 16/285 |
| 2019/0138587 A1 | 5/2019 | Silk et al. | |
| 2020/0065365 A1* | 2/2020 | Pulaski | G06Q 10/00 |

OTHER PUBLICATIONS

Forum Discussion Titled "Excel Calculation Based on Input from Any Cell," Super User, Apr. 2017-May 2017, 5 pages, retrieved from <https://superuser.com/questions/1199707/excel-calculation-based-on-input-from-any-cell?noredirect=1&lq=1>.

Forum Discussion Titled "EXCEL—How to Have a Formula Output and User Input on the Same Cell," Super User, Sep. 2014-Jun. 2016, 6 pages, retrieved from <https://superuser.com/questions/813639/excel-how-to-have-a-formula-output-and-user-input-on-the-same-cell>.

International Search Report and Written Opinion regarding corresponding PCT Application No. PCT/US2019/047314, dated Dec. 9, 2019.

* cited by examiner

| | Bold Font | - Locked (not editable) |
|---|---|---|
| | Dark Shading | - Constraint |
| | Light Shading | - Manually Edited Cell (MEC) |
| | Regular Font | - Computed Cell |
| | *Italics* | - Back-solved Cell |

Result Segment
Result Segment Stats
Component Segments
Component Segment Stats
— 300

|   | A | B | C | D | E |
|---|---|---|---|---|---|
| 1 | Vertical | 2017 | | 2018 | |
| 2 | Accounting & Tax | $ 35,00 | 20 % | $ 50,000 | 10 % |
| 3 | Financial Services | $ 8,750 | 5 % | $ 50,000 | 10 % |
| 4 | Government | $ 43,750 | 25 % | $ 100,000 | 20 % |
| 5 | Real Estate | $ 0 | 0 % | $ 100,000 | 20 % |
| 6 | Retail | $ 0 | 0 % | $ 0 | 0 % |
| 7 | Legal | $ 87,500 | 50 % | $ 200,000 | 40 % |
| 8 | | $ 175,00 | 100 % | $ 500,000 | |
| 9 | | | | | |
| 10 | Y-Y Growth | $ 125,00 | 192 % | $ 325,00 | 186 % |

Locked Historical Values

*FIG. 3A*

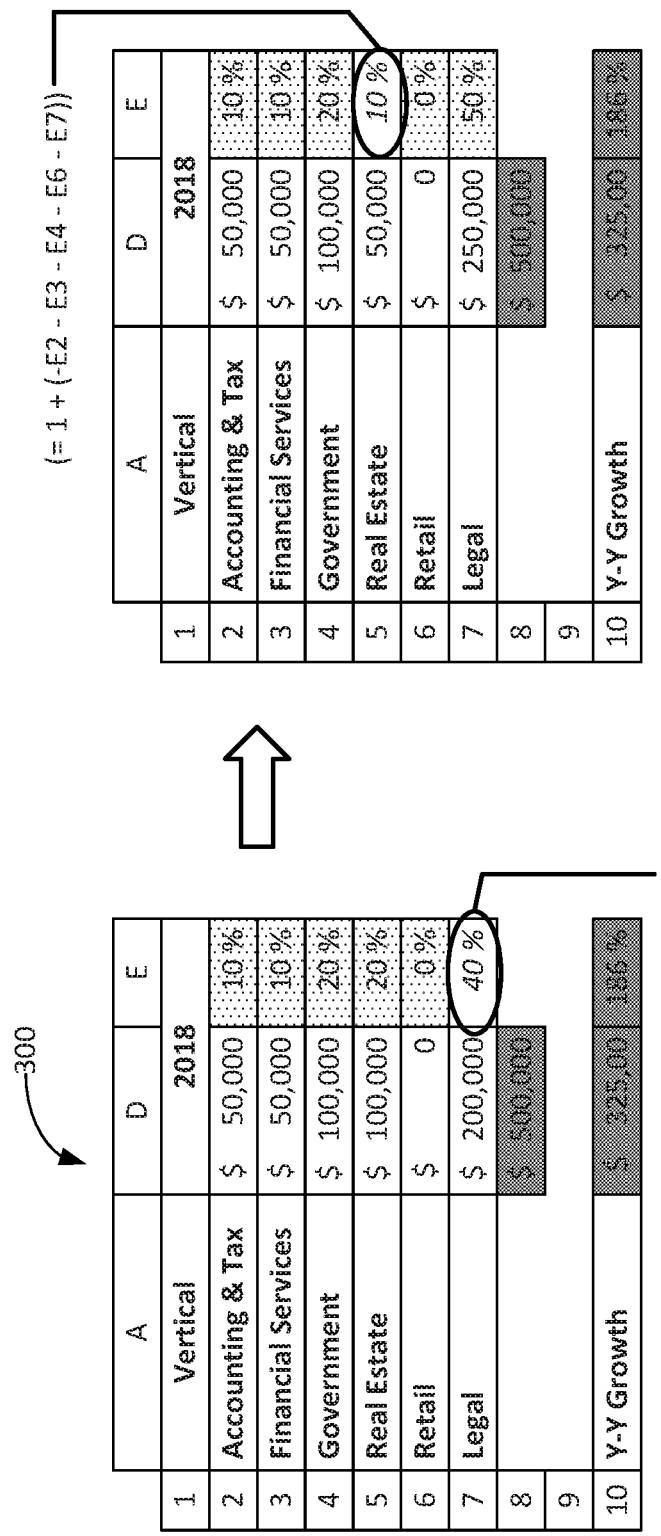

← 600

| |
|---|
| 602 User Edits Target Cell. The edit may consist of entering a discrete value or entering a formula. |
| 604 Is the Target Cell a Static Value? If the edit simply comprises replacing a static value with another, then no further processing may be needed. The edit is confirmed and the cell format is updated to indicate that the cell was modified by the user. |
| 606 Do Other Segments Need to be Adjusted? The algorithm determines if other segments (i.e., segments that do not contain the target cell) must be adjusted to ensure that the Component Segments generate the correct result in the Result Segment when operated on by the operator. The algorithm also ensures that no circular references are created by the edit. If answer is Yes, then answer is stored for later. Adjustments to other segments are performed after adjustments to the Target Cell's segment. |

| |
|---|
| 606A Segment Adjustment Check #1: If the segment being changed is a Result Segment and the Result Segment was previously calculated based on the Component Segments and an operator, one of the Component Segments will need to be adjusted as a result of a change to the Target Cell. (Answer is YES); ELSE |
| 606B Segment Adjustment Check #2: If the segment being changed was "back solved" based on another segment, one of the other segments will need to be adjusted as a result of a change to the Target Cell. (Answer is YES); ELSE |
| 606C Segment Adjustment Check #3: If the Target Cell was changed to (or from) a formula that was based on a percentage of the Result Segment value and the Result Segment was based on a sum or product of the other segments. (Answer is YES); ELSE |
| 606D Other Checks, depending on what stats are used for the segments. |
| 606E The answer is NO: Other segments do not need be adjusted. |

| |
|---|
| 608 Change Format of Target Cell to indicate that a change has been made. |
| 610 Make Adjustments required to other cells as a result of changes to target cell. For any adjustments, the following checks occur: |

| |
|---|
| 610A If a cell is adjusted, the formatting of the cell may also be adjusted to indicate that the cell was adjusted by the application and not the user. |
| 610B If the system needs to adjust a cell but the required adjustment violates a rule, such as a constraint, then the edit to the target cell is not allowed and all changes are aborted. |

| | |
|---|---|
| 612 | Adjust stats for the segment containing the Target Cell. All adjustments below are subject to the tests contained in Step 610. |
| | 612A  If the Target Cell is not the Value Cell of the segment, the Value Cell of the segment must be updated to a formula, which is typically based on the Target Cell. |
| | 612B  Formulas for stat cells (other than Target Cell, if it were a stat cell) are created and saved to each stat cell. |
| 614 | Adjust other segments. If it was determined in Step 606 that other segments need to be adjusted, those segments are adjusted now to ensure no circular references and to maintain integrity of smart grid. All adjustments below are subject to the tests contained in Step 610. |
| | 614A  If the Target Cell is in the Results Segment, the application asks user which Component Segment to adjust. ELSE |
| | 614B  If the Target Cell is in a computed Component Segment, the user may select another Component Segment or the Result Segment to adjust. ELSE |
| | 614C  If the Target Cell is neither in the Result Segment or in a computed Component Segment, the Result Segment will be adjusted. |
| | 614D  The segment selected in Steps 614A – 614C is then adjusted by the application to ensure that no circular references are created as a result of the change to the Target Cell and to ensure that the integrity of the smart grid and all of its formulas are intact. |
| | | 614D(1)  If the segment to be adjusted is the Result Segment, the Result Segment's value cell is set to a formula that is dependent on the operator used to derive the Result Segment value from the Component Segments' values. ELSE |
| | | 614D(2)  If the segment to be adjusted is a Component Segment, the Component Segment's value cell is set to a formula that "back-solves" the cell value based on the operator used to derive the Result Segment's value from the Component Segments. |
| | | 614D(3)  Once the adjusted segment's value cell is set to the correct formula (according to 614D(1) or 614D(2)), the stat cells for the adjusted segment are checked and adjusted and the corresponding segments in the next period (if present) are checked and adjusted for any required formatting changes. |
| 616 | Update formatting of future periods, if necessary. |
| 618 | Update any higher-level smart grids that the edited smart grid rolls up to. |

Addend Segments

| | A | B | B | B |
|---|---|---|---|---|
| | | Cell Value | Cell Content | Cell Content | Cell Content |
| 1 | | | | | |
| 2 | Addend 1 | $ 5,000 | $ 5,000 | $ 5,000 | = B5 + (-B2) |
| 3 | Addend 2 | $ 1,000 | $ 1,000 | = B5 + (-B2) | $ 1,000 |
| 4 | | | | | |
| 5 | Result | $ 6,000 | = B2 + B3 | $ 6,000 | $ 6,000 |

Adjustment to Result Segment

Adjustment to Component Segments

FIG. 8B

Factor Segments

| | A | B | B | B |
|---|---|---|---|---|
| | | Cell Value | Cell Content | Cell Content | Cell Content |
| 1 | | | | | |
| 2 | Factor 1 | $ 2,000 | $ 2,000 | $ 2,000 | = B5 * (1/B2) |
| 3 | Factor 2 | 25 % | 25 % | = B5 * (1/B1) | 25 % |
| 4 | | | | | |
| 5 | Result | $ 500 | = B2 * B3 | $ 500 | $ 6,000 |

Adjustment to Result Segment

Adjustment to Component Segments

900

| 902 Determine a numerator and a denominator for the formula based on inspection of each Component Segment. Each segment will be in the numerator or the denominator of the formula based on the following rules: |
|---|

| 902A IF the Value cell of the inspected Segment is based on a Percent of the Total formula (a percent of the Result Segment's Value), then the value "-X", where X is the cell that contains the Segment's Percent of Total stat is appended to the Denominator. This will result in a Denominator that looks like "-A3-A7-A11", where A3, A7, and A11 are cell references to Percent of Total stats. |
|---|
| 902B ELSE, the Value cell of the Segment is appended to the Numerator. Before the Value cell is appended to the Numerator, a special character may first be appended (so that it precedes the reference to the Value cell of the Segment), based on the following rules: |

| 902B(1) IF the current Segment is the first Segment being added to the Numerator and has been defined as an Inverse Value<br>   The special character is a "-" in the case of the Segment being an addend, else "1/" if it's a factor. |
|---|
| 902B(2) ELSE, if the current Segment is not the first Segment being added to the Numerator: |

| 902B(2)i IF the Segment has been defined as an Inverse Value, the special character is a "-" for an addend or "/" for a factor; |
|---|
| 902B(2)ii ELSE (the Segment is not an Inverse Value), the special character is a "+" for an addend or "*" for a factor. |

| 904 After the Numerator and Denominator have been created using the process above, they are finished with additional formatting before being used in the formula for the Result's Value cell as follows: |
|---|

| 904A IF the Numerator is empty, then the Numerator is set to "1". ELSE, if the Numerator is not empty, a "Magnification Factor" value may be specified that is used to Magnify (or Shrink) the segments before multiplying them together. For example, to covert "Dollars" to "Millions of Dollars", or vice versa. If a "Magnification Factor" has been specified for this smart grid, "*X" is appended to the Numerator, where X is the "Magnification Factor" value. |
|---|

904B IF the Denominator is empty, then the formula is set to the value of the Numerator. ELSE (the Denominator is not empty), the formula is set to "(N)/(1D)" where N is the Numerator and D is the Denominator. This would result in a formulas that would include the following possibilities:

"(A1+A6)/(1-A12-A16)" where A1 and A6 are Value cells for segments that have fixed values and A12 and A16 are the Percent of Total cells for two other Segments, and all are addend Segments.

"A1*A6*1/A8*1024" where A1, A6, and A8 are Value cells for Segments that are factors; A8 is the Value cell of a Segment that has been defined as in InverseValue; and 1024 is the "Magnification Factor" of the smart grid.

906 After setting the Result Segment's Value cell to the correct formula, (1) all the stat cells for the Result segment must be updated and (2) the cells for the Result Segment in the next Period (if present) should be checked and adjusted for any required formatting changes.

*FIG. 9B*

GRID-BASED DATA PROCESSING WITH CHANGEABLE CELL FORMATS

CROSS REFERENCE TO RELATED APPLICATIONS

This is a non-provisional application based on U.S. Provisional Patent Application Ser. No. 62/720,549, filed Aug. 21, 2018, which is incorporated by reference in its entirety, and to which priority is claimed

FIELD OF THE INVENTION

The present application relates to grid-based data processing software.

INTRODUCTION

Grid-based data processing software applications, such as spreadsheets, are commonly used for a variety of business functions, such as financial planning and modeling, budgeting, and the like. As is familiar to those of skill in the art, such software applications typically present the user with a grid of cells (also called fields) displayed on a user interface (UI). The cells can contain data of various types, such as text, numeric values, and formulas, FIG. 1 illustrates several aspects of an embodiment of a grid-based application (i.e., a spreadsheet) as may typically be used in a collaborative business environment. The illustrated spreadsheet 100 is a portion of a modeling/planning spreadsheet that a business might use to model their spends marketing to various vertical markets (Accounting & Tax, Financial Services, Government, etc.). The particular spreadsheet 100 reflects historical data from 2017 and is used to model spends for 2018. In a typical use case, a high-level employee, such as a CFO of the company may create the model and a subordinate employee, such as a marketing manager, may edit some of the cells of the spreadsheet to use the model. In this disclosure, the creator (or ultimate controller) of the page is referred to as the "administrator" and the subordinate is referred to as the "user."

The illustrated spreadsheet 100 contains column identifiers (A-E) and row identifiers (1-10), which are used to address cells within the grid. The spreadsheet 100 contains labels (typically treated as text by the application), which identify what information is contained in the various rows and columns. In the illustrated spreadsheet, the historical data (values) for 2017 is shown in darkly shaded cells and is locked (i.e., the cells are not editable by the user).

Assume, for this discussion, that the administrator has determined that $500,000 may be used to market to all of the verticals and that the user may apportion that amount among the various verticals. Thus, the administrator has provided a value of 500,000 in cell D8 and locked that cell. The administrator has provided formulas in cells D2-D7, which are responsive to the user's apportionment (i.e., percentage) of the total for each vertical. For example, cell D5 contains the formula (=E5*D8). If the user determines to apportion 20% (i.e., 0.20) of the total to Real Estate, then the formula contained within cell D5 reflects an amount of $100,000.

Notice that cells E2-E7 (denoted in FIG. 1 by light shading) of the spreadsheet 100 are the only cells that the user can edit. Such constraints may sometimes unduly limit the user's ability to use the model embodied in the spreadsheet in a way that they might wish. For example, imagine that instead of allocating a percentage, the user would rather allocate a dollar amount to a particular vertical. If the user wishes to allocate $50,000 to real estate, the user cannot simply enter 50,000 in cell D5 because that cell is locked. Instead, the user must calculate the appropriate percentage to enter into cell E5, which would result in the amount of $50,000 being reflected in cell D5 (i.e., 10%). That mode of thinking may be counterintuitive to the user and in more complex models and applications may be very difficult.

One solution to this problem may be unlocking some or all of the cells, such as cells, D2-D7, so that the user can simply enter a value of 50,000 into cell D5. However, entering a value into cell D5 would overwrite the formula that is contained within that cell. It would not be apparent to someone later using the application that the formula had been overwritten. Also, cell E5 would no longer correctly reflect the correct apportionment corresponding to D5 unless the user corrected cell E5 manually or populated cell E5 with an appropriate formula to calculate the correct percentage. Again, such changes would not be readily apparent to a later user of the model, potentially leading to undetected errors.

Thus, there is a need for grid-based data processing applications that allow users creative freedom to edit virtually any cell while still maintaining the integrity of formulas and models embodied in the application.

SUMMARY

Disclosed herein is a non-transitory computer-readable medium comprising instructions which, when executed by a computing device, cause the computing device to perform steps comprising: presenting, on a display, a grid comprising a plurality of cells arranged in one or more rows and one or more columns, wherein the cells comprise: one or more fixed cells and a one or more computed cells, wherein each fixed cell contains a value or a formula that is independent of the other fixed cells and of the computed cells, and wherein each of the computed cells contains a formula that comprises the one or more fixed cells as arguments; defining a relationship among the plurality of cells; receiving a user input specifying an edit to a target cell selected from the plurality of cells; determining if the edit meets one or more of a condition (a) and a condition (b), wherein: condition (a) is that the edit will result in a circular reference among two or more of the formulas of the plurality of cells, and condition (b) is that the edit will violate the relationship among the plurality of cells; if the edit meets condition (a), condition (b), or both conditions (a) and (b), automatically editing one or more problem cells to prevent the circular reference and to maintain the relationship among the plurality of cells, wherein each of the one or more problem cells is one of the plurality of cells and is not the target cell; and editing the target cell based on the user input. According to some embodiments, defining a relationship among the plurality of cells comprises associating metadata with the plurality of cells. According to some embodiments, the metadata is automatically determined by inspecting the plurality of cells after receiving user input but before changes have been made to the cells. According to some embodiments, automatically editing the one or more problem cells comprises automatically populating at least one of the one or more problem cells with a new formula. According to some embodiments, automatically editing the one or more problem cells comprises automatically, algorithmically deriving the new formula. According to some embodiments, defining a relationship among the plurality of cells comprises associating metadata with the plurality of cells, and wherein automatically, algorithmically deriving the new formula is based on the metadata. According to some embodiments, the plurality of cells comprises at least a first subset of cells representing a first period of time and a second subset of cells representing a second period of time and wherein defining a relationship among the plurality of cells comprises defining a relationship between at least one cell of the first subset and at least one cell of the second subset. According to some embodiments, defining a relationship between at least one cell of the first subset and at least one cell of the second subset comprises: receiving a user input specifying an edit to a target cell selected from the first subset or the second subset; inspecting the cells of the first subset and the second subset; automatically determining metadata; and associating the metadata with one or more cells of the first subset and the second subset. According to some embodiments, the target cell is a cell in the first subset of cells and wherein the one or more problem cells is in the second subset of cells. According to some embodiments, the steps further comprise changing a visual indicator associated with the target cell to indicate that the target cell has been edited and/or changing a visual indicator associated with the one or more edited problem cells to indicate that the one or more edited problem cells have been edited. According to some embodiments, the steps further comprise prompting for user input indicating a selection of the one or more problem cells to be edited. According to some embodiments, the formula that comprises the one or more fixed cells as arguments and defines a relationship between the one or more fixed cells and the computed cell is selected from the group consisting of a mathematical formula, a date calculation formula, and a text-based formula. According to some embodiments, the steps further comprise determining if editing either the target cell or the one or more problem cells violates a constraint, and if so, aborting the editing of both the target cell and the one or more problem cells.

Also disclosed herein is a method of updating a grid-based data processing application based on user inputs, wherein the grid-based data processing application comprises a plurality of cells, the method comprising: receiving a user input specifying an edit to a target cell selected from the plurality of cells; determining, using a processor, if the edit meets one or more of a condition (a) and a condition (b), wherein condition (a) is that the edit will result in a circular reference in two or more of the formulas of the plurality of cells, and condition (b) is that the edit will violate a defined relationship among the plurality of cells; if the edit meets condition (a), condition (b), or both conditions (a) and (b), automatically editing one or more problem cells to prevent the circular reference and to maintain the relationship among the plurality of cells, wherein the one or more problem cells is one of the plurality of cells and is not the target cell; and editing the target cell based on the user input. According to some embodiments, the defined relationship among the plurality of cells is determined based on metadata associated with the plurality of cells. According to some embodiments, automatically editing the one or more problem cells comprises automatically populating the one or more problem cells with a new formula. According to some embodiments, automatically editing the one or more problem cells comprises automatically, algorithmically deriving the new formula based on the metadata. According to some embodiments, the method further comprises changing a visual indicator associated with the target cell to indicate that the target cell has been edited and/or changing a visual indicator associated with the edited one or more problem cells to indicate that the problem cell has been edited. According to some embodiments, the method further comprises prompting for user input indicating a selection of the one or more problem cells to edit from among the plurality of cells. According to some embodiments, the method further comprises determining if editing either the target cell or the one or more problem cells violates a constraint, and if so, aborting the editing of both the target cell and the one or more problem cells.

BRIEF DESCRIPTION OF THE DRAWINGS

FIGS. 3A-3E illustrate embodiments of a smart grid editing processes.

FIGS. 6A and 6B show an example of an algorithm for smart grid editing.

FIGS. 8A and 8B show examples of segments of a smart grid.

FIGS. 9A and 9B show an example algorithm for deriving a formula for editing a problem cell of a smart grid.

DESCRIPTION

Disclosed herein are grid-based data processing applications that display a grid, referred to herein as a smart grid, on a screen of user interface. The smart grids described herein have functionality that overcomes the limitations described above. Namely, a user has greater freedom to edit cells within the smart grid in a way that is intuitive, and the application is capable of making changes to other cells that are impacted by the user's edits so as to maintain the integrity of the smart grid.

The grid-based data processing applications described herein may comprise stand-alone applications or may be included as functions within the context of more complex data processing packages, such as financial planning and modeling software packages. Alternatively, the grid-based data processing applications may be embodied as add-ons, plug-ins, and/or extensions of general-purpose data processing applications, such as spreadsheet applications. The particular embodiments described herein are contemplated for use in the financial planning and modeling context, and thus, the illustrated smart grids relate to those aspects. However, it should be noted that the techniques and algorithms may be adapted for use in any endeavor requiring data processing, such as science, engineering, social science, medicine, and the like.

As will be appreciated by those of skill in the art, the grid-based data processing applications may be embodied and/or implemented in non-transitory computer readable media executable on a computing device. Examples of suitable non-transitory computer-readable media include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and readable, once-writeable, or re-writeable CD-ROM and DVD-ROM disks. The grid-based data processing applications described herein may be stored and executed on a personal computer or may be implemented in a cloud-based manner, for example.

Figure 2:
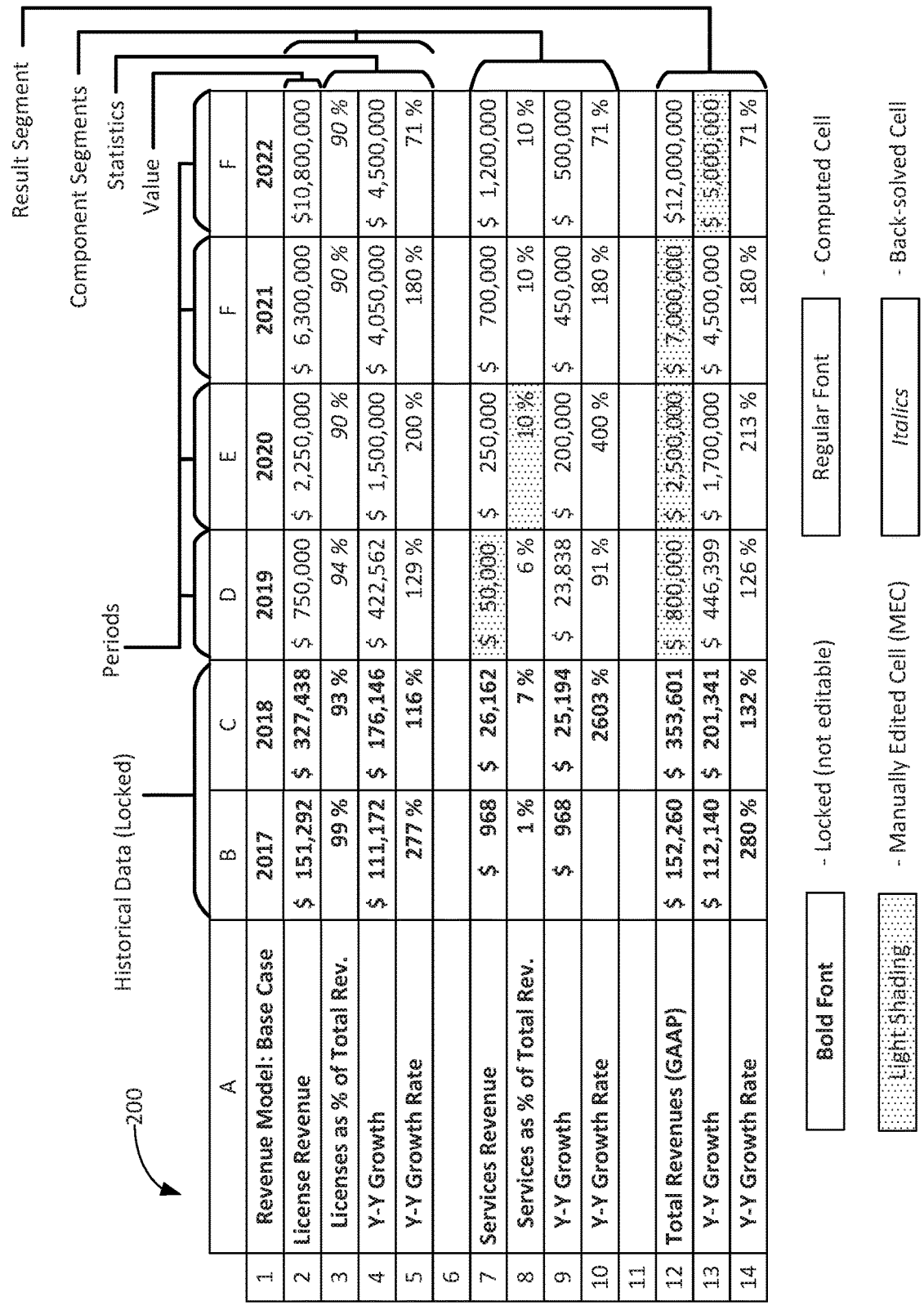
FIG. 2 shows an example of a smart grid in accordance with aspects of the disclosure.

FIG. 2 illustrates an example of an embodiment of a smart grid 200. The example smart grid 200 is a revenue model based on licensing revenue and service revenue. The smart grid 200 contains historical data for years 2017 and 2018 and models forward looking financial information for years 2019-2022. In the smart grid 200, any information that is indicated in bold font is locked and is not editable by a user. For example, the historical data (years 2017 and 2018) is locked. Any information not in bold font is editable by the user. Some editable cells within the smart grid contain manually entered values (i.e., manually entered numbers) and other editable cells within the smart grid contain calculated values (i.e., values calculated by formulas). A user is able to edit any of those editable cells, for example, by manually entering a new value into the cell. If a user manually enters a new value into a cell that currently contains a calculated value (i.e., a formula), the smart grid will adjust by automatically updating other related cells to account for the edit and maintain the integrity of the smart grid. For example, the application might automatically determine an appropriate formula to update another cell so as to maintain the integrity of the smart grid. This is different than the functionality of a traditional spreadsheet, wherein overwriting a formula with a value would simply break the interconnections between cells within the spreadsheet, as described above in the Introduction.

Smart grids, as disclosed herein, may be comprised of segments, each of which comprise values that are processed by an operator to yield a result. According to some embodiments, segments can be categorized as component segments and result segments. The values of the component segments are processed by an operator to produce a value of the result segment. The operator defines the relationship that relates the values of the component segments to the value of the result segment. The operator may describe a mathematical relationship, such as addition or multiplication. The relationship may also be based on a date calculation or a text-editing relationship, such a concatenation. According to some embodiments, a different operator may be allowed for each segment and parentheses may be allowed among the segments, such is in a relationship among three components segments (A, B, and C) and a result segment (D) such that $(A+B)*C=D$.

The smart grid 200 has three segments—License Revenue, Services Revenue, and Total Revenues (GAAP). It should be noted that the segments of smart grid 200 are arranged vertically with periods of time arranged horizontally, but in some embodiments, the segments may be arranged horizontally and the periods arranged vertically, and in other embodiment time periods may not be applicable. In the smart grid 200, the License Revenue segment and the Services Revenue segment are component segments and the Total Revenues (GAAP) is a result segment. In the smart grid 200, the values of the component segments are processed by an addition operator to yield the value of the result segment. Other examples of operators include multiplication, powers (e.g., squared, cubed, etc.), trigonometric functions, etc. Note that subtraction is simply an addition operator using a negative number and division can be a multiplication operator using an inverse (1/x).

Each segment comprises a value cell, which are the numbers processed (or determined) by the operators to define the relationship among the component segments and the result segment. In the smart grid 200, the values associated with the License Revenue segment are on row 2 of the smart grid, the values associated with the Services Revenue segment are on row 7, and the values associated with the Total Revenues segment are on row 12. It should be appreciated that the "values" associated with each segment may be manually entered numbers or they may be calculated values based on formulas. Moreover, their status (manually entered or calculated) may change as the smart grid is edited and adjusted, as described below. In either case, they are still referred to as "values" of a segment in this disclosure.

A segment may also include statistic cells (stats), which are the numbers located below the values in each of the segments in the smart grid 200 and which reflect various metrics related to the values. Each segment may have the same or different stats as other segments, or may have none at all. For example, in the smart grid 200, both the License Revenue and the Services Revenue segments have three stats—% of Total Rev., Y-Y Growth, and Y-Y Growth Rate. The result segment (Total Revenues) has only two stats—Y-Y Growth and Y-Y Growth Rate.

Segments may have periods, which typically specify values (and/or stats) of that segment at different times. The smart grid 200 has two historical periods (2017 and 2018) and four forward-looking periods (2019-2022). The periods may relate to each other by formulas, for example, for specifying growth, rate of growth, or other metrics related to the segment over time. The periods may be in days, weeks, months, years, etc. There may also be a total period (for example, 12 monthly periods may have a $13^{th}$ period which is the annual total of the months). It should be noted here that multiple smart grids may relate to each other. For example, a smart grid having periods of months may roll up to a higher-level smart grid having periods of years, etc.

Embodiments of smart grids, as disclosed herein, may use various indicators to indicate possible options for editable cells within the grid and to indicate various properties of the cells within the grid. Such indicators may include the use of fonts, font styles, font colors, background colors, and mouse-over indicators, for example. The indicators can be used to indicate information about the cells, such as: whether or not a cell is editable, whether the content of a cell is a number or formula that was manually entered by the user, or whether the content of a cell is a formula that has been automatically generated or adjusted by the system, and the like. These properties will be explained below in more detail.

In the smart grid 200, the user is free to edit any cells that are not shown in bold. Cells shown in bold font are not editable. For example, the historical data is shown in bold font, indicating that those cells are locked and not editable.

There are three types of editable cells in the illustrated smart grid 200, each of which are visually distinctive based on indicators associated with the cells. Not all smart grids may use such indicators, or may use a subset of these indicators.

Cells indicated with a lightly shaded background are Manually Edited Cells (MECs). MECs are cells where either (a) a user has input data, or (b) the administrator has indicated to the current users that these cells are the default cells where the user is requested to input data. Input data may be a numeric value (such as 10% in cell E8) or a formula specified by the user (such as "50% greater than the previous period", which in the example of cell E8 would result in 9% being displayed to the user in Cell E8).

Cells indicated with regular font (and no background) are computed cells. Computed cells are cells that contain a formula and that have not been previously manually edited by a user. However, the user can edit computed cells, for example, by overwriting the formula with a value, as described below, or another formula.

Cells indicated with italic font (and no background) are back-solved cells (BSCs). BSCs are a subset of computed cells that are back-solved to meet a constraint. For example, the numbers on row 3 of the smart grid 200 are BSCs that are back-solved to meet the constraint that the percentage values must sum to 100%. Constraints may be set by the administrator of the smart grid or they may be built into the smart grid application (as is the case in smart grid 200, where two segments that are added together much each total 100% of the result segment). Further examples of other smart grids described below contain cells within the smart grid that are constrained and therefore not editable by a user, without the user obtaining special permissions. In this disclosure, constrained cells are indicated with dark shading. The smart grid 200 does not contain any such constrained cells. The user can edit BSCs that are not locked, as described in further examples below. As BCSs are also a type of computed cell, some implementations of a smart grid may not choose to use a separate indicator for BSCs.

The visual indicators associated with the cells are updated as the smart grid is edited, to reflect changes to the type of information contained within the cells. For example, if a user manually enters a number in a cell that presently contains a computed value, the indicator for that cell may change to reflect that it is now a MEC. The user's edit may also necessitate an adjustment to one or more related cells, which adjustment may be automatically executed by the application. For example, when the user overwrites the computed cell, another related cell may change from a numerical value (MEC) to a computed cell. Its indicator will change accordingly. For example, entering a value of 10% into cell D8 in smart grid 200 would change cell D7 from being a MEC to a computed cell with a formula of "=D8*D12" and a displayed value of $80,000.

Figure 1:
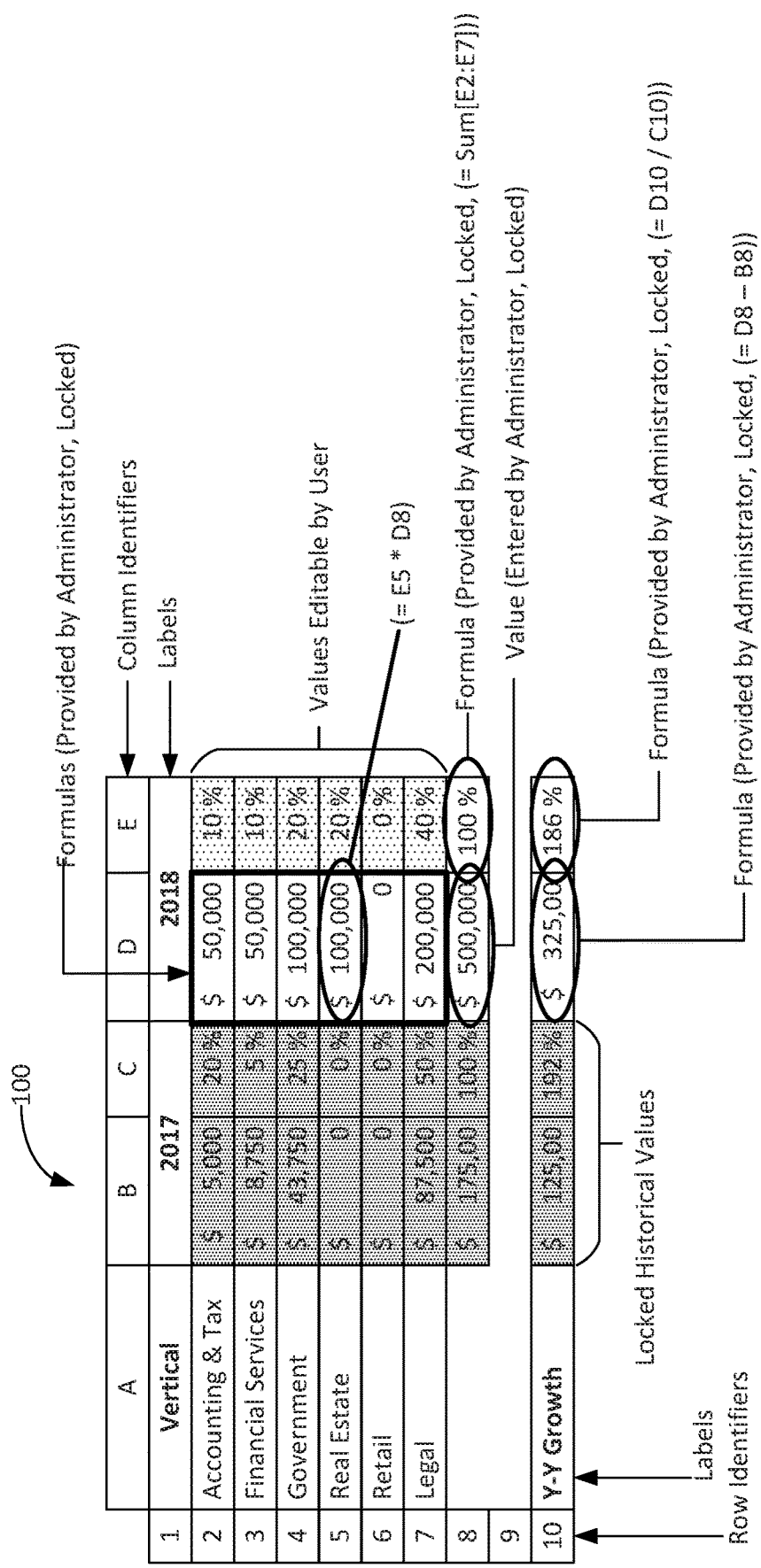
FIG. 1 shows a gird-based data processing application in accordance with the prior art.

Having introduced some aspects of smart grids, smart grid functionality will now be discussed with reference to less complicated embodiments for ease of explanation. FIG. 3A illustrates another example of a smart grid, illustrated as smart grid 300. The smart grid 300 expresses the same information as expressed in spreadsheet 100 (FIG. 1), but its functionality differs in several important respects. Particularly, the smart grid provides the user with much more flexibility to edit cells. The user can edit any cell that "makes sense" for the work they are doing, and the application adjusts accordingly to maintain the integrity of the application.

The smart grid 300 contains one historical period (2017) and one forward-looking period (2018). As with the smart grid 200 (FIG. 2), smart grid 300 comprises component segments and a result segment. The component segments of smart grid 300 correspond to the verticals (rows 2-7) and the result segment corresponds to row 8. The component segment values for 2018 are displayed in column D (cells D2-D7) and the component segment stats are contained in column E (cells E2-7). Notice that the component segment values are operated on by an addition operator to yield a result value in cell D8. The result segment also includes two stats (cells D10 and E10). This example illustrates that there is flexibility in how segments, values, and stats are arranged with respect to each other. The identities of cells as comprising segments, values, and/or stats are determined based on the functional relationships between the cells and not based on how the cells are located within the smart grid.

The smart grid 300 uses visual indicators to indicate which cells within the grid may be edited and to provide additional information about each of the cells. All cells of the smart grid 300 not shown in bold font are editable. Notice that cells E2-E6 are MECs, meaning that the user or the administrator has manually input the numbers into those cells. Cells D2-D7 are computed cells, as is cell E5. Cell E7 is also a BSC, which is back solved according to the constraint that all of the percentages in column E must sum to 100%.

Cells D8, D10, and E10 are shown with a darkly shaded background, indicating that those cells are constrained. A cell having a constraint may not be editable by the user without the user either (a) requesting a change to the constraint, or (b) possessing proper permissions to override the constraint. For example, the user may be required to enter a password to override a constraint. Recall from the example of spreadsheet 100 (FIG. 1) discussed in the Introduction that the administrator determined that a total of $500,000 may be used to market to all of the verticals in 2018. Using the smart grid 300, the administrator has constrained the cell D8 so that that cell cannot not be easily edited. Since the values of cells D10 and E10 are calculated based on D10 and the historical data (which is not editable), those cells are likewise constrained.

Figures 3B, 3C:
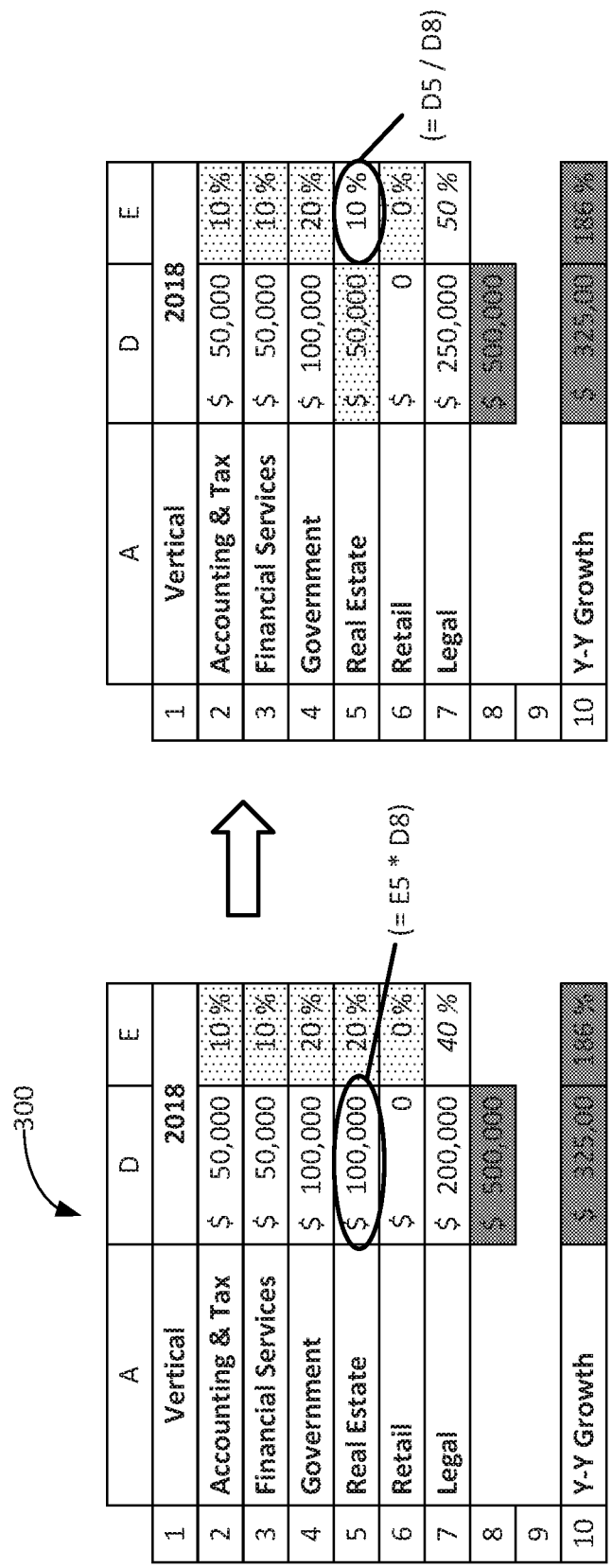

FIGS. 3B-3E illustrate some examples of editing the smart grid 300. Note that the 2017 historical data is not shown in FIGS. 3B-3E, as it is not relevant to these examples. In FIG. 3B, in the current state of the smart grid, cell E5 is a MEC and cell D5 is a computed cell. Specifically, cell D5 contains a formula computing the spend for the Real Estate vertical by multiplying the percentage contained in E5 by the total spend value contained in D8. In other words, cell D5 is a computed cell that contains a formula that comprises cells E5 and D8 as arguments.

Now assume that the user wishes to allocate $50,000 to the Real Estate vertical. As described in the Introduction, using the prior art spreadsheet applications, the user would have to calculate the correct percentage value to enter into cell E5 to yield a computed value of 50,000 in D5. But the smart grid allows the user to simply enter the value of 50,000 into D5, as shown in FIG. 3C.

Referring to FIG. 3C, the smart grid adjusts in several ways when the user enters 50,000 in cell D5. Cell D5, which was previously a computed value, now becomes a MEC. The formatting indicator changes to light shading to reflect that change. Cell E5 now becomes a computed cell, and the formatting changes to regular font and no background shading. The computation contained in E5 is configured automatically by the application to maintain the integrity of the page, i.e., it is adjusted to (=D5/D8). Now E5 correctly reflects the value of 10%. Since E5 has changed from 20% to 10%, the BSC E7 changes from 40% to 50% according to the formula (=1−E2−E3−E4−E5−E6), thus maintaining consistency of the constraint that all percentages sum to 100%. Likewise, the computed cell D7 also adjusts from $200,000 to $250,000 according to the formula (=E7*D8).

As seen in FIGS. 3B and 3C, manually editing any cell, if it is not already a MEC, changes that cell to a MEC. The attributes of the other cells adjust in a manner required to maintain the integrity of the smart grid. Those adjustments occur automatically, allowing the user to edit the smart grid in an intuitive manner.

FIGS. 3D and 3E illustrate an example of a user editing a back-solved cell (BSC). In FIG. 3D, cell E7 is a BSC that is computed based on fitting the percentages into the constraint that all of the percentages must total 100%. Assume that the user changes E7 from 40% to 50%. In that case, E7 becomes a MEC, as reflected in FIG. 3E. Another cell in the range E2:E6 must become a BSC, again, to ensure that the constraint is met. This could happen by manual selection. For example, when the user edits E7 (the BSC), the user may be presented with a choice of which of the other cells to designate as the new BSC, using a pop-up menu for example. Alternatively, the new BSC may be selected automatically based on criteria, such as which of the available cells are not MECs, or which of the available cells have the smallest numerical value, etc. The user may be asked to confirm an automatic selection.

Figures 4, 5:
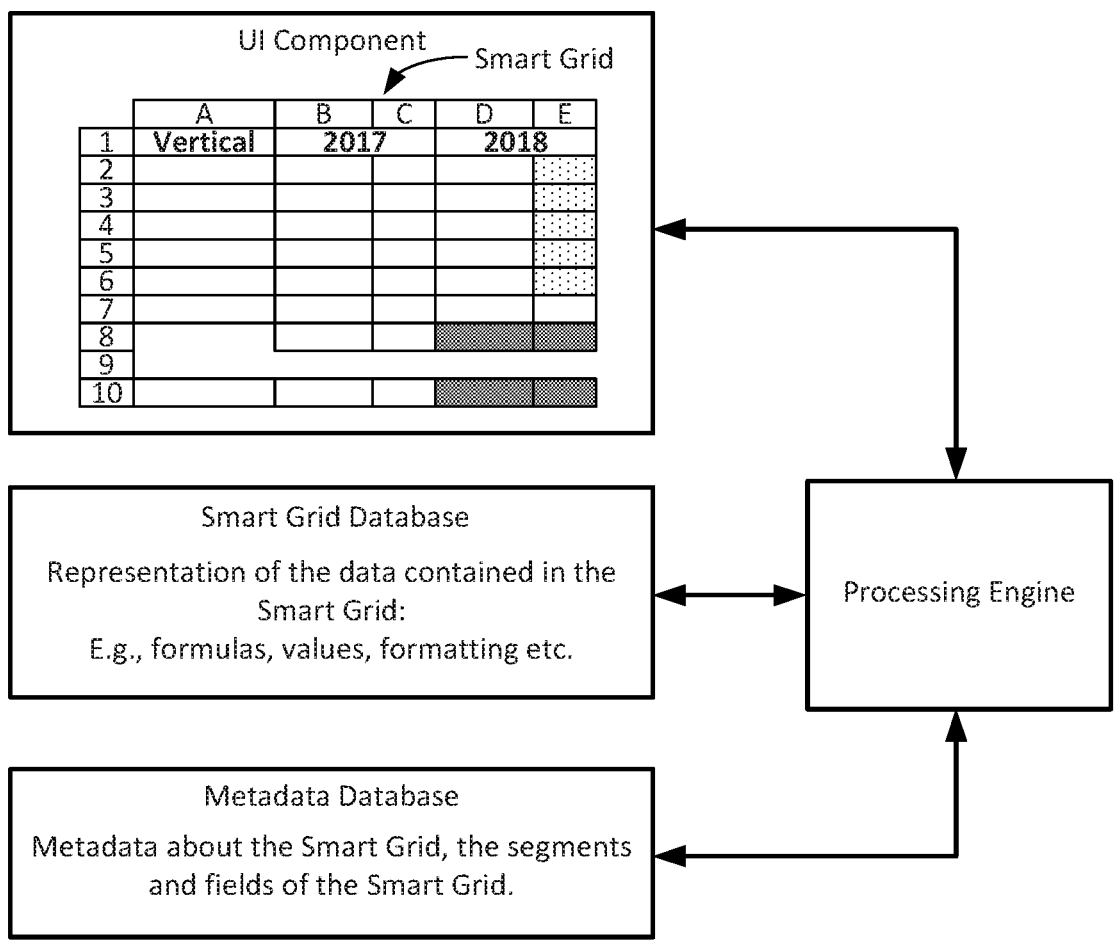
FIG. 4 shows an embodiment of a smart grid with a visual indicator for indicating related cells.
FIG. 5 shows components of an embodiment of a smart grid application.

It will be apparent, based on the above discussion, that the various cells of smart grids are interrelated, i.e., editing one cell may result in the application making automatic changes to other cells within the smart grid. Accordingly, embodiments of the application may provide an indication of which cells are interrelated. For example, the page may provide an indication of "downstream" content that rolls-up to the current data, or "upstream" content that present data rolls up to. FIG. 4 illustrates an embodiment of smart grid 300, wherein hovering over cell D3 causes a box 402 to be displayed around the cells D2:E10, indicating that all of the cells are related to each other.

Based on the above discussion of smart grids and their functionality, the following observations will be apparent:

- Smart grids may be comprised of segments, which may be one or more component segments and a result segment.
- Segments include a value cell and may include statistics cells (stats). Each segment may have a different set of statistics or none at all.
- Examples of stats described herein include:
  - Percent of Total: the segment's value as a percent of the result segment's value.
  - Percent of Other: the segment's value as a percent of a value in some other cell outside the bounds of the smart grid.
  - Growth Over Prior Period: the difference between the segment's value from the value in another period.
  - Growth Rate Prior Period: the difference in the segment's value from the value in another period expressed as a percentage.
  - Note that other stats may be included, depending on implementation.
- A relationship exists between the values, the component segments, and the value of the result segment, which may be expressed by one or more operators.
- Segments may have periods, which may relate to each other by formulas that specify behavior as a function of time. Periods may be yearly, monthly, daily, or any other desired period of time.
- Smart grids with a given set of periods (e.g., months) may roll up to a smart grid with higher level periods (e.g., years).
- All cells in a smart grid that are editable may be easily identifiable as such by visual indicators.
- All cells that contain an initial number value or that have been edited by a user are referred to as MECs, and may be identifiable as such.
- If a user edits a cell within a smart grid, the application checks to determine if any other cells of the smart grid need to be adjusted (edited) to maintain the integrity of the smart grid values, stats, and formulas used to relate the components segments to the value segments based on an addition, multiplication, or other operator (including the period in which with edited cell occurs and all other periods of the smart grid). The application must then make any such necessary adjustments. The application may also need to adjust other smart grids that roll-up to/from the edited smart grid).
- In some cases, if a user edits a cell, the application may ask the user which cells to adjust to maintain integrity. This may be accomplished by presenting the user with a pop-up menu or dialogue box, for example.
- The smart grid may include a visual indicator to indicate which cells are related to each other. For example, moving the cursor over a cell may bring up an indicator showing which other cells are related to that cell.

FIG. 5 illustrates a high-level conceptual view of components of an embodiment a grid-based data processing application for constructing smart grids, as described herein. The application includes a UI component, which is configured to render the smart grid on a screen of a UI so that users can interact with the smart grid. The grid-based application includes a smart grid database that stores data related to the smart grid displayed on the UI. Examples of such data include the values and formulas contained in the cells of the smart grid, as well as formatting information (e.g., visual indicators) for the cells. The application also comprises a metadata database that contains metadata associated with the smart grid. The metadata comprises information about the smart grid, its segments, and the cells (such as the value cell and stat cells) within each segment, as described in more detail below. Stated simply, the metadata describe what is contained within each cell of the smart grid and how those cells relate to each other. The application also comprises a processing engine that operates to control the functionality of the smart grid.

To display a smart grid, the user interface (UI) component reads data from the smart grid database and renders the smart grid on the screen of a UI. When a user interacts with the smart grid, for example by editing a cell, the processing engine performs algorithms (described below) that use the metadata, to determine how the smart grid must be adjusted to account for the user's edit. For example, the processing engine may determine (1) if the desired edit is permitted (i.e., does it require violating a constraint), (2) if additional cells require adjustment, and if so (3) how should other cells be adjusted, and (4) how to adjust the visual indicators of the adjusted cells. After these determinations are completed, allowed edits are committed to the smart grid database and the smart grid is updated accordingly.

According to some embodiments, the metadata associated with a smart grid may define smart grid attributes or segment attributes. The segment attributes include properties that may be unique to each segment and properties relating to the cells within a segment, such as value and stat cells. The smart grid attributes specify how the segments relate to each other (such as the operator used to relate components segments to the result segment) and also include attributes unique to each smart grid.

The following are examples of smart grid metadata attributes:

- Sheet ID: Identifies the worksheet tab (within a smart grid document) that contains the smart grid. This is useful, for example, when multiple smart grids are related to each other, such as when one smart grid rolls-up to another smart grid which may be in another worksheet tab.
- Name: Unique name (ID) of the smart grid.
- Range: Range of cells within the Sheet ID that comprise the bounds of the smart grid.
- Value Column (or Row) Increment: Specifies the number of columns (or rows) between periods, for example, if the value cell for 2019 is B4 and the value cell for 2020 is D4, the Value Column Increment is 2. If Value Column Increment is not specified, the default value is assumed to be 1, according to some embodiments.

Prior-period Value Column (or Row): The identifier of the column ("A" or "B", for example, if within the same Sheet ID) that contains data for the period that precedes the first period in the smart grid, for example, if the smart grid has annual time periods starting with 2019, the Prior-Period Value Column would be the column that contains data for 2018.

Period Label Row (or Column): If a label is used to describe the periods, this is the row in which the Period Labels can be found.

Labels Location: If labels are used to describe the components in each segment, the Labels Location metadata specifies the column name for the labels.

Labels Vertical: "YES", if Labels are shown vertically in the Labels Location column; else, Labels are assumed to be spread out horizontally starting with the Labels Location column.

Result Formula Type: this specifies the type of operator that is applied to the component segment values to arrive at the result segment value. Examples include: "Factor" if the component segments are multiplied to get the result segment, "Concatenate" if component segments contain text that should be combined together to yield the value of the result segment, and "Addend" if component segments are added to get the result segment. As described above, more complex operators, such as powers, date functions, trigonometric functions, and the like may be used, depending on the implementation. It should be noted here, that the Result Formula Type defines the relationship between the component segments and the result and does not necessarily denote whether the information contained within a value cell for a particular segment is a numerical value or a formula. For example, FIG. 8A shows three possible configurations wherein two addend segments are related to a result segment via an addition operator. Likewise, FIG. 8B shows three possible configurations wherein two factor segments are related to a result segment via a multiplication operator.

Magnification Factor: used if a segment's value used in calculations is a factor of its value displayed to, and edited by, the user. For example, Magnification Factor of 0.000001 may be used if a value of a 500,000,000 should be displayed as 500, such as when the numbers are expressed in "Millions of Dollars," etc.

Is 'Percent of Total' Statistic Located by Row: If TRUE, this stat is on a different row from the value cell; else, it's in a different column.

Is 'Percent of Other' Statistic Located by Row: If TRUE, this stat is on a different row from the value cell; else, it's in a different column.

Is 'Growth' Statistic (compared with Prior Period) by Row: If TRUE, this stat is on a different row from the value cell; else, it's in a different column.

Is 'Growth Rate' Statistic (compared with Prior Period) by Row: If TRUE, this stat is on a different row from the value cell; else, it's in a different column.

The following are examples of segment metadata attributes:

Segment ID: Unique identifier of the segment

Segment Name: Segment name

Is Result Segment: YES, if this segment is a result segment; else, NO, the segment is a component segment.

Is Inverse Value: For Factors, YES, if the inverse value (1/X) of this segment's value should be multiplied by other segments to get the value for the result segment; effectively uses multiplication operator to achieve division. For Addends, YES, if the negative of this segment's value should be added to other segments to get the value for the result segment.

Value Row (or Column): The row number on which the value cell can be found for this segment.

Label Row (or Column): The row number on which the label for this segment can be found.

'Percent of Total' Location: If this stat is used for this segment, the row (or column) number on which this statistic can be found for this segment.

'Percent of Total' Must be 0 to 1: If YES, the Percent of Total value is constrained to values between 0 and 1; changes will not be allowed that push that stat to a negative number or a number greater than 1. This is useful for constraining percentages not to exceed 100%.

'Percent of Other' Location: If this stat is used for this segment, the row (or column) number on which this statistic can be found for this segment.

Other Value Row (or Column): If 'Percent of Other' is used, this specifies the row in which the Other value cell can be found for this segment.

'Prior Period Growth' Location: If this stat is used for this segment, the row (or column) number on which this statistic can be found for this segment.

'Prior Period Growth Rate' Location: If this stat is used for this segment, the row (or column) number on which this statistic can be found for this segment.

Default Fill: Specifies the default color to be used to fill this cell if no other special color codes are applied to the cell (e.g., if the cell has not been manually edited by the user).

Value Type: The type of value to be found in the Value cell (e.g., "Percentage").

Value Format: A code to specify how to format the Value cell (e.g., "P0" could mean a percentage with 0 decimal places after the '.' character for a format that looks like "50%").

Note that smart grids may have segments that flow from top to bottom or that flow from left to right. Thus, the increments and location information contained in the metadata described above considers the flow of the segments. For example, a smart grid with segments flowing from top to bottom may use a Value Row Increment, whereas a smart grid with segments flowing from left to right may use a Value Column Increment. It should also be appreciated that the above are only examples of possible metadata attributes. Not all of these metadata attributes may be needed, and other metadata may be included, based on particular implementations.

FIG. 6 illustrates an example of an algorithm 600 that the processing engine may use to update a smart grid when a user edits a cell. As used herein, the cell that the user edits is referred to as the "target cell." Other cells that may be adjusted automatically because of the edit are referred to as "problem cells" because they must be adjusted to fix a problem created by the edit to the target cell.

At step 602, the user edits a target cell. The edit may comprise entering a discrete number value into the target cell or it may comprise entering a formula, such as 10% more than the value in the previous period. At step 604, the algorithm may determine if the desired edit is simply overwriting one static value in the target cell with another static value. If the answer is yes, then further tests and adjustments may not be needed, and the edit may be simply executed. The formatting of the edited target cell may be updated to reflect that it has been edited. If the answer at step 604 is no, then further checks and processing must be executed.

If the edit to the target cell comprises more than simply overwriting one static value with another, then other cells of the smart grid may need to be adjusted. There are generally two reasons that the smart grid may need to be adjusted. One reason is that the edit may create a circular reference. As will be appreciated by those familiar with grid-based applications (such as spreadsheets), a circular reference is created when, given a set of two or more cells, the cells contain formulas that reference one or more other cells in the set, either directly or indirectly, and thus its values of the cells are not resolvable.

Another reason that other cells may need to be adjusted is if the edit to the target cell destroys the relationship defined between a group of interrelated cells. For example, if one cell is supposed to contain the sum of values contained in a plurality of other cells, but the edit to the target cell overwrites the formula that achieves that relationship, then some other cell will need to be adjusted to contain a formula that fulfills the relationship.

Thus, when the system receives the input specifying the edit to the target cell, the system inspects related cells to see if either of those two conditions are met. The system further takes steps to determine a problem segment that contains one or more problem cells, i.e., one or more cells that can be automatically edited to prevent the circular reference and/or to maintain the relationship among the plurality of cells.

At step 606 the algorithm determines if any other segments (i.e., segments that do not contain the target cell) will need to be adjusted because of the edit to the target cell. As mentioned above, the determination is based on two criteria—(1) whether the correct relationship will be maintained between the component segments and result segment following the edit, and (2) whether the edit will create a circular reference. Adjustments to other segments are required when any of the following conditions are met—(1) (as described in Step 606A) the segment being changed is a result segment and the result segment was previously calculated based on the component segments and an operator; (2) (as described in Step 606B) the segment being changed was "back solved" based on one or more other segments; or (3) (as described in Step 606C) the target cell was changed to (or from) a formula that was based on a percentage of the result segment value and the result segment was based on a sum or product of the other segments. Other checks 606D for circular references, and/or to maintain the integrity of the relationship among the segments, may need to be implemented, depending on the operators and what other stats are used for the segment and depending on the user's particular edits to a stat cell. For example, if the result segment is the sum of addend segments and the user sets all addend segments' "percent of total" stats to a fixed value, this would result in a circular reference and the user would need to be asked to make a change to one of the other segments or the result segment. If the answer to any of the checks detailed in Steps 606A-606D is yes, then the answer YES is stored in memory so that the other segment can be adjusted after adjustments are made for the segment containing the target cell. If the answer is NO, then no adjustments are required for the segments not containing the target cell.

At step 608, the format of the target cell is changed to indicate that the target cell has been edited.

Step 610 begins the adjustment of other cells (i.e., edits to one or more "problem cells") of the smart grid based on the user's edit to the target cell. According to some embodiments, whenever the system automatically adjusts a cell, the system may also change the formatting of that cell to indicate that the cell was adjusted by the system and not the user 610A. Also, whenever the system needs to adjust a cell, the algorithm may check to confirm that the required adjustment is allowed. For example, if the system needs to adjust a cell, but the required adjustment violates a rule, such as a constraint, then that required adjustment will not be allowed. In that case, the edit to the target cell and all of the steps described above will be aborted. The actions described in Step 610 may be executed for both adjustments to the segment containing the target cell and for adjustments to segments not containing the target cell.

Figure 7:
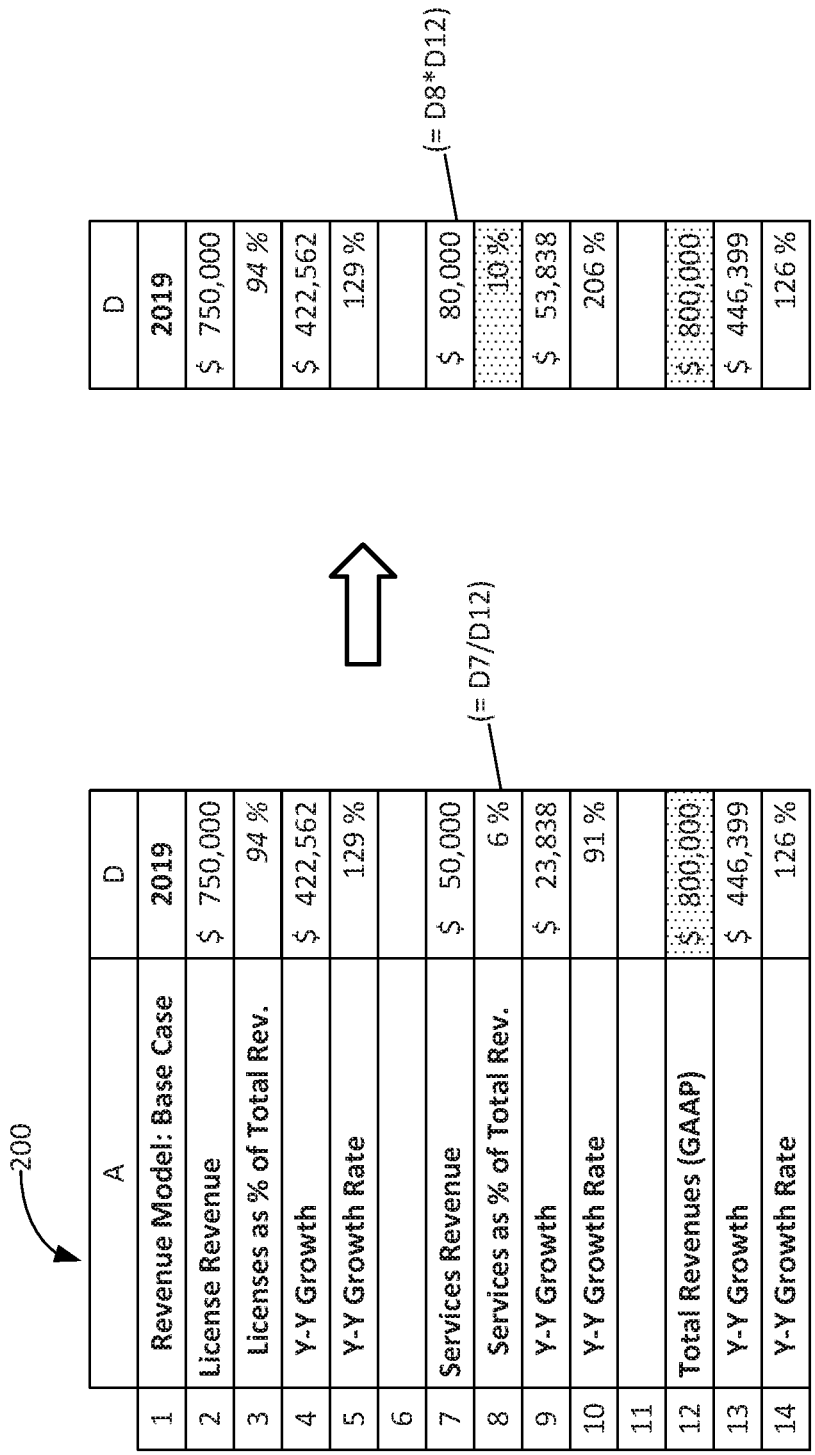
FIG. 7 shows an example of a smart grid editing process.

At Step 612 adjustments are made to problem cells contained within the segment containing the target cell. If the target cell is not the value cell of the segment, the value cell of the segment must be updated to a formula, which is typically based on the target cell (Step 612A). For example, FIG. 7 shows a portion of the smart grid 200 (FIG. 2). Assume that D8 is the target cell and the user overwrites the formula currently contained within the target cell with a value of 10%. The system automatically adjusts the value cell D7 with a formula based on the target cell, so that the integrity is maintained. Formulas for stat cells other than the target cell are then created and the cells are updated, if necessary (Step 612B, FIG. 6B).

Referring still to FIG. 6B, at Step 614 the adjustment to segments not containing the target cell begins. If the answer at Step 606 was YES, the algorithm determines which segment to adjust. If the target cell is in the result segment, one of the component cells may be adjusted. The system may ask the user which component cell to adjust (Step 614A), for example, using a pop-up menu. If the target cell is a computed cell of a component segment, the user may select to adjust another component segment or the result segment (Step 614B). If the target cell is neither in the result segment nor in a computed cell of a component segment, then the result segment will be adjusted (Step 614C).

Having determined which segment to adjust, the system then adjusts the segment according to Steps 614D. According to Step 614D(1), if the segment to be adjusted is the result segment, the result segment's value cell is set to a formula that is dependent on the operator used to derive the result segment's value from the component segments' values. According to Step 614D(2), if the segment to be adjusted is a component segment, the component segment's value cell is set to a formula that "back-solves" the cell value based on the operator used to derive the result segment's value from the component segments.

The adjustments at Steps 614D(1) or Step 614D(2) ensure that the value cell of the result segment is consistent with the value cells of the component segments and the operator relating the segments. For example, if the component segments are addends, the sum of the value cells of the component segments must yield the value contained in the value cell of the result segment. If the component segments are factors, then multiplying the value cells of the component segments must yield the value contained in the value cell of the result segment. FIGS. 8A and 8B show examples of formulas that meet these conditions (FIG. 8A for addends and FIG. 8B for factors). The situations illustrated in FIGS. 8A and 8B are very simple examples of adjusting the value cells based on the operator that relates the result segment to the component segments. For more complicated examples, deriving the formulas to adjust the relevant cells may be quite complex, but the algorithm basically algebraically determines the correct formula to populate the problem cell of the segment based on the interrelationship between the cells. An example of an algorithm for determining how to derive a formula for updating the value cell of a segment is discussed below, with reference to FIGS. 9A and 9B.

Still referring to FIG. 6B, once the other segments not containing the target cell have been adjusted, the formatting of future periods is updated, if necessary, at Step 616. At Step 618, any higher-level smart grids to which the current smart grid rolls up, or lower-level smart grids which roll up to this smart grid, are evaluated and updated if necessary. For example, if the present smart grid being edited and adjusted comprises monthly periods, that smart grid might roll up to another smart grid having periods of years. Having edited/adjusted the monthly smart grid, it may be necessary to update the yearly smart grid as well.

FIGS. 9A and 9B illustrate one example of an algorithm 900 for generically deriving a formula for making an adjustment to a result segment's value cell based on an edit to a target cell contained within a component segment. It should be appreciated that the algorithm 900 is only one example; other algorithms could be used for the same purpose and are within the ability of those skilled in the art.

At Step 902, the first step for deriving the formula for the result segment is to determine a numerator and a denominator for the formula based on properties of the component segments, as indicated by the metadata associated with the smart grid and smart grid segments. Referring to Step 902A, if the value cell of the component segment is based on a Percent of the Total formula (a percent of the result segment's value), then the value "−X", where X is the cell that contains the Segment's Percent of Total stat is appended to the denominator. This will result in a denominator that looks like "−A3−A7−A11", where A3, A7, and A11 are cell references to Percent of Total stats.

Referring to Step 902B, if the value cell of the component segment is not based on a Percent of the Total formula, then the value cell of the component segment is appended to the numerator. Before the value cell is appended to the numerator, a special character may first be appended to the numerator so that it precedes the reference to the value cell based on the criteria outlined in Steps 902B(1) and 902B(2). According to Step 902B(1), if the current segment is the first segment being added to the numerator and has been defined as an Inverse Value, the special character is a "−" in the case of the segment is an addend and is "1/" if the segment is a factor. According to Step 902B(2), if the segment being added to the numerator is not the first segment being added to the numerator: if the segment has been defined as an Inverse Value, the special character is a "−" for an addend or "/" for a factor (Step 902B(2)i); otherwise, the special character is a "+" for an addend or "*" for a factor if the segment has not been defined as an Inverse Value (Step 902B(2)ii).

Referring to Step 904, after the numerator and denominator have been created using the process above, they are finished with additional formatting, as described in Steps 904A and 904B. According to Step 904A, if the numerator is empty, then the numerator is set to "1". Otherwise, if the numerator is not empty, a "Magnification Factor" value may be specified that is used to Magnify (or Shrink) the segments before multiplying them together. The Magnification Value can be for expressing values relating to "Dollars" as "Millions of Dollars", or vice versa, for example. If a "Magnification Factor" has been specified for this smart grid, "*X" is appended to the Numerator, where X is the "Magnification Factor" value. Finally, at Step 906, the result segment's value cell is set to the formula, as derived above, and the stat cells for the result segment are updated, if necessary. The result cells for the following period may also be checked and updated, if necessary.

Algorithm 900 determines how to adjust the result segment, for example, due to an edit to a target cell contained within one of the component cells. To adjust a component segment, a similar algorithm may be used to derive a formula that "back solves" for the value cell of the component segment.

Figure 10B:
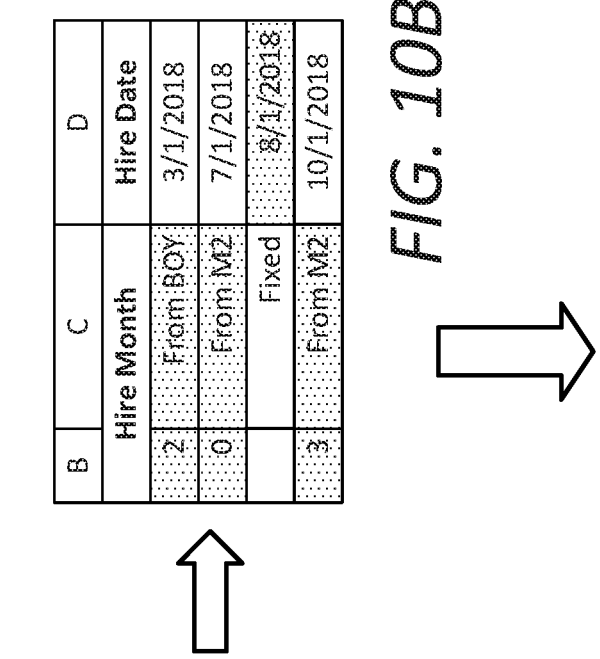
FIGS. 10A-10C show an example of a smart grid using a date calculation formula.
Figure 10C:
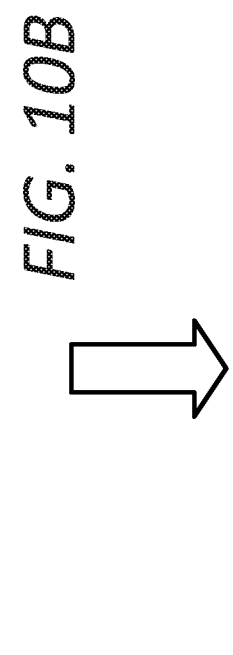
Figure 10A:
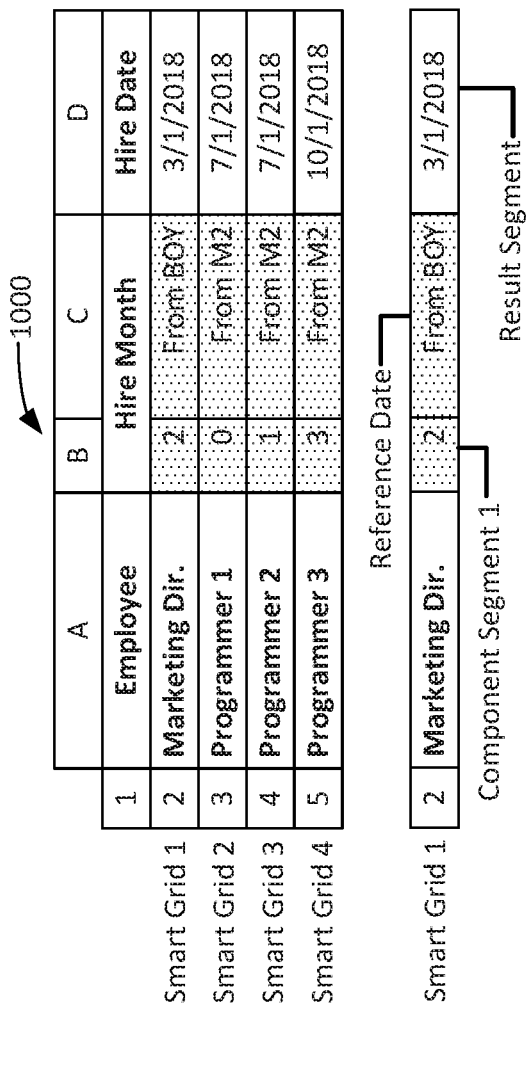

As mentioned above, smart grids can use dates as well as numerical values. FIGS. 10A-10C illustrate an array of smart grids 1000 for calculating metrics relating to an employee's date of hire. Each of rows 2-5 of the array constitute a smart grid comprising a single component segment (column B) which is a number of months, a result segment (column D) which is a hire date for the new employee, and a formula (column C) that specifies the relationship between the components segment (number of months) and the value segment (hire date). In this example, the user may modify the value cell of either the component segment or the result segment, or may modify the operator used to specify the formula that relates the two segments. The formula may be months after a milestone, such as the beginning of the year (BOY), a beginning of a quarter, a product release date, etc. The formula might also indicate that the result segment is a fixed date, which would result in the value cell of the component segment as being Undefined in the case of such a formula. The user may select the formula from a drop-down menu, for example, and milestone dates may be specified elsewhere in the application.

Notice that in FIG. 10A the cells of columns B and C are shown as lightly shaded, indicating that those cells are MECs and that the formula itself is a cell in the smart grid. Also notice that the cells in column D are shown with no background, indicating that those are computed cells, calculated based on the date calculator. However, a user may wish to enter a hire date directly into a cell in column D, as shown in FIG. 10B. In that case, the cell of column D becomes a MEC, the formula (column C) is changed to "fixed", and the value of the component segment is Undefined and no longer displayed to the user. The user may further wish to modify the formula, as shown in FIG. 10C. In that case, the cell of column C becomes a MEC and the cell of column B becomes a computed cell calculated based on the hire month and the formula.

It will be appreciated that the disclosed methods and systems improve the operation of a computing device used to execute a grid-based data processing application. For example, the disclosed method and systems improve a user's experience by allowing the user to edit cells within the grid-based application that is natural and intuitive.

While the invention herein disclosed has been described in terms of specific embodiments and applications thereof, numerous modifications and variations could be made thereto by those skilled in the art without departing from the scope of the invention set forth in the claims.

What is claimed is:

1. A method of updating a grid-based data processing application based on user inputs, wherein the grid-based data processing application comprises a plurality of cells, the method comprising:
    associating metadata with the plurality of cells to define a relationship among the plurality of cells, wherein the metadata does not change based on editing of the cells;
    receiving a user input specifying an edit to a target cell selected from the plurality of cells;
    determining if the edit meets one or more of a condition (a) and a condition (b), wherein:
        condition (a) is that the edit will result in a circular reference among two or more of the plurality of cells, and
        condition (b) is that the edit will violate the relationship among the plurality of cells defined by the metadata;
    if the edit meets condition (a), condition (b), or both conditions (a) and (b), automatically editing one or more problem cells of the plurality of cells to prevent the circular reference and/or to maintain the relationship among the plurality of cells,
        wherein the one or more problem cells is one of the plurality of cells and is not the target cell, and
        wherein the automatically editing of the one or more problem cells comprises either replacing a value contained within the problem cell with a formula or replacing a formula contained within the problem cell with a value; and
    editing the target cell based on the user input.

2. The method of claim 1, wherein automatically editing the one or more problem cells comprises automatically populating the one or more problem cells with a new formula.

3. The method of claim 2, wherein automatically editing the one or more problem cells comprises automatically, algorithmically deriving the new formula based on the metadata.

4. The method of claim 1, further comprising changing a visual indicator associated with the target cell to indicate that the target cell has been edited and/or changing a visual indicator associated with the edited one or more problem cells to indicate that the problem cell has been edited.

5. The method of claim 1, further comprising prompting for user input indicating a selection of the one or more problem cells to edit from among the plurality of cells.

6. The method of claim 1, further comprising determining if editing either the target cell or the one or more problem cells violates a constraint, and if so, aborting the editing of both the target cell and the one or more problem cells.

7. The method of claim 1, wherein the plurality of cells comprises at least a first subset of cells representing a first period of time and a second subset of cells representing a second period of time and wherein defining a relationship among the plurality of cells comprises defining a relationship between at least one cell of the first subset and at least one cell of the second subset.

8. The method of claim 7, wherein defining a relationship between at least one cell of the first subset and at least one cell of the second subset comprises:
    receiving a user input specifying an edit to a target cell selected from the first subset or the second subset;
    inspecting the cells of the first subset and the second subset;
    automatically determining metadata; and
    associating the metadata with one or more cells of the first subset and the second subset.

9. The method of claim 7, wherein the target cell is a cell in the first subset of cells and wherein the one or more problem cells is in the second subset of cells.

10. A non-transitory computer-readable medium comprising instructions which, when executed by a computing device, cause the computing device to perform steps comprising:
    presenting, on a display, a grid comprising a plurality of cells arranged in one or more rows and one or more columns, wherein the cells are configured to contain a number or a formula;
    associating metadata with the plurality of cells to define a relationship among the plurality of cells, wherein the metadata does not change based on editing of the cells;
    receiving a user input specifying an edit to a target cell selected from the plurality of cells;
    determining if the edit meets one or more of a condition (a) and a condition (b), wherein:
        condition (a) is that the edit will result in a circular reference among two or more of the plurality of cells, and
        condition (b) is that the edit will violate the relationship among the plurality of cells defined by the metadata;
    if the edit meets condition (a), condition (b), or both conditions (a) and (b), automatically editing one or more problem cells of the plurality of cells to prevent the circular reference and/or to maintain the relationship among the plurality of cells,
        wherein the one or more problem cells is one of the plurality of cells and is not the target cell, and
        wherein the automatically editing of the one or more problem cells comprises either replacing a value contained within the problem cell with a formula or replacing a formula contained within the problem cell with a value; and
    editing the target cell based on the user input.

11. The non-transitory computer readable medium of claim 10, wherein the metadata is automatically determined by inspecting the plurality of cells after receiving user input but before changes have been made to the cells.

12. The non-transitory computer readable medium of claim 10, wherein automatically editing the one or more problem cells comprises automatically populating at least one of the one or more problem cells with a new formula.

13. The non-transitory computer readable medium of claim 12, wherein automatically editing the one or more problem cells comprises automatically, algorithmically deriving the new formula.

14. The non-transitory computer readable medium of claim 13, wherein automatically, algorithmically deriving the new formula is based on the metadata.

15. The non-transitory computer readable medium of claim 10, wherein the plurality of cells comprises at least a first subset of cells representing a first period of time and a second subset of cells representing a second period of time and wherein defining a relationship among the plurality of cells comprises defining a relationship between at least one cell of the first subset and at least one cell of the second subset.

16. The non-transitory computer readable medium of claim 15, wherein defining a relationship between at least one cell of the first subset and at least one cell of the second subset comprises:
    receiving a user input specifying an edit to a target cell selected from the first subset or the second subset;
    inspecting the cells of the first subset and the second subset;

automatically determining metadata; and associating the metadata with one or more cells of the first subset and the second subset.

17. The non-transitory computer readable medium of claim 15, wherein the target cell is a cell in the first subset of cells and wherein the one or more problem cells is in the second subset of cells.

18. The non-transitory computer readable medium of claim 10, wherein the steps further comprise changing a visual indicator associated with the target cell to indicate that the target cell has been edited and/or changing a visual indicator associated with the one or more edited problem cells to indicate that the one or more edited problem cells have been edited.

19. The non-transitory computer readable medium of claim 10, wherein the steps further comprise prompting for user input indicating a selection of the one or more problem cells to be edited.

20. The non-transitory computer readable medium of claim 10, wherein the steps further comprise determining if editing either the target cell or the one or more problem cells violates a constraint, and if so, aborting the editing of both the target cell and the one or more problem cells.

* * * * *